Patented Mar. 13, 1934

1,951,077

UNITED STATES PATENT OFFICE 1,951,077

PURIFICATION OF PHOSPHORIC ACID

Willard H. Woodstock, Chicago Heights, Ill., assignor to Victor Chemical Works, Chicago, Ill., a corporation of Illinois No Drawing. Application May 4, 1933,
Serial No. 669,456

12 Claims. (Cl. 23—165)

This invention relates to the purification of phosphoric acid, and particularly to the removal of lead therefrom.

In the procedure heretofore followed for the purification of commercial phosphoric acid, it has been the practice to treat the acid with hydrogen sulfide to remove arsenic and copper impurities, and to treat with small percentages of sulfuric acid to precipitate the lead impurities. By this procedure, the lead content is reduced to 2.5 to 5 parts per million by weight.

The discovery has now been made that the addition of a compound capable of forming lead halogen compounds, the halogen radicle of which has an atomic weight not less than that of bromine, will reduce the lead content of phosphoric acid below 2.5 parts per million, and even below 1 part per million. This result is particularly remarkable in that such lead halogen compounds have a water-solubility from twenty-five to two hundred and fifty times that of lead sulphate. For example, the addition of 6.5 parts per million of potassium iodide to a 75% phosphoric acid containing lead impurities to the extent of 2.6 parts per million, reduced the lead content below 1 part per million. Salts containing the bromide ion will reduce the concentration below 1.5 parts per million, but in general, the iodides are preferred.

The precipitation of the lead impurities is preferably carried out in a strong phosphoric acid, say 50% concentration or above. Any suitable temperature may be employed.

It is not essential to remove the bulk of the lead with sulfuric acid, but it is preferred to do so, using the halogen compounds only for the final purification.

As an example of the process, a 60% phosphoric acid was treated with sulfuric acid equivalent to .5% or less $SO_3$ on the treated acid. The precipitated lead sulphate may be immediately filtered, or not, as desired. If filtered at once there is a saving in iodide consumption. Hydrogen sulfide gas was then passed into the acid until the arsenic and copper had been precipitated. An alkali iodide such as potassium iodide is then added in an amount necessary to remove the lead impurities, and the acid filtered. Any excess iodine may be removed by bubbling air through the mixture.

The lead halogen compounds have a tendency to re-dissolve in the acid after a few hours, and it is therefore desirable to filter soon after the precipitation of the lead. It has also been discovered, however, that this redissolving tendency may be very materially delayed, and separation of the lead halogen compounds facilitated by carrying out the precipitation in the presence of hydrogen sulfide. With small amounts of hydrogen sulfide present, the lead precipitate is stable over a period of several days. In order to prevent such re-solution, it is preferable that the hydrogen sulfide be present in an amount nearly sufficient to saturate the phosphoric acid.

The precipitation of the lead impurities in strong phosphoric acid can be accomplished with or without the presence of hydrogen sulfide in the acid, but it is preferred to add the precipitating halogen compound to an acid containing hydrogen sulfide as the precipitated lead compound is more stable in this case, and separation of the insoluble lead halogen compound is more easily carried out.

The foregoing detailed description has been given for clearness of understanding only, and no unnecessary limitations should be understood therefrom, but the appended claims should be construed as broadly as permissible, in view of the prior art.

I claim:

1. The method of treating phosphoric acid for removal of lead impurities contained therein, which comprises adding a compound capable of yielding halogen ions having an atomic weight not less than that of bromine, whereby a lead halogen compound is precipitated, and separating the precipitated lead halogen compound.

2. The method of treating strong phosphoric acid for removal of lead impurities contained therein, which comprises adding a compound capable of yielding halogen ions having an atomic weight not less than that of bromine, whereby a lead halogen compound is precipitated, and separating the precipitated lead halogen compound.

3. The method as set forth in claim 2, in which the acid has a concentration of 50% or more.

4. The method as set forth in claim 2, in which the halogen ion is an iodide.

5. The method as set forth in claim 2, in which the halogen ion is a bromide.

6. The method as set forth in claim 2, in which excess halogen is removed by blowing air through the acid.

7. The method as set forth in claim 2, in which the lead content of the acid is reduced before adding the halogen compound by the addition of sulfuric acid.

8. The method of treating strong phosphoric acid for removal of lead impurities, which comprises adding a minor quantity of sulfuric acid to precipitate lead sulfate, and then adding a compound yielding halogen ions having an atomic weight not less than that of bromine, whereby a lead halogen compound is precipitated, and separating the acid from the precipitated lead compound.

9. The method of treating strong phosphoric acid for removal of lead impurities, which comprises adding a minor quantity of sulfuric acid to precipitate lead sulfate, separating the precipitated lead sulfate, and then adding a compound yielding halogen ions having an atomic weight not less than that of bromine, whereby a lead halogen compound is precipitated, and separating the acid from the precipitated lead compound.

10. The method of delaying re-solution in phosphoric acid of lead halogen compounds precipitated therefrom, in which the halogen has an atomic weight not less than that of bromine, which comprises adding hydrogen sulfide to the phosphoric acid.

11. The method as set forth in claim 1 in which said lead halogen compound is precipitated in the presence of hydrogen sulfide.

12. The method as set forth in claim 8 in which said lead halogen compound is precipitated in the presence of hydrogen sulfide.

WILLARD H. WOODSTOCK.